United States Patent
Valadez et al.

(10) Patent No.: US 7,925,065 B2
(45) Date of Patent: Apr. 12, 2011

(54) FINDING BLOB-LIKE STRUCTURES USING DIVERGING GRADIENT FIELD RESPONSE

(75) Inventors: Gerardo Hermosillo Valadez, West Chester, PA (US); Senthil Periaswamy, Malvern, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 904 days.

(21) Appl. No.: 11/841,144

(22) Filed: Aug. 20, 2007

(65) Prior Publication Data

US 2008/0049973 A1 Feb. 28, 2008

Related U.S. Application Data

(60) Provisional application No. 60/839,289, filed on Aug. 22, 2006, provisional application No. 60/839,290, filed on Aug. 22, 2006.

(51) Int. Cl.
G06K 9/00 (2006.01)
(52) U.S. Cl. .......................... 382/128; 382/197
(58) Field of Classification Search .................. 382/128
See application file for complete search history.

(56) References Cited

U.S. PATENT DOCUMENTS

| | | | |
|---|---|---|---|
| 7,809,178 B2* | 10/2010 | Spies et al. ................ | 382/131 |
| 2002/0141627 A1* | 10/2002 | Romsdahl et al. ......... | 382/131 |
| 2003/0095721 A1* | 5/2003 | Clune et al. ............... | 382/294 |
| 2003/0142868 A1* | 7/2003 | Tannenbaum et al. ..... | 382/199 |
| 2003/0147556 A1* | 8/2003 | Gargesha et al. .......... | 382/190 |
| 2005/0105800 A1* | 5/2005 | Periaswamy et al. ...... | 382/190 |
| 2005/0185838 A1* | 8/2005 | Bogoni et al. ............. | 382/165 |
| 2005/0232472 A1* | 10/2005 | Scholze .................... | 382/124 |

FOREIGN PATENT DOCUMENTS

WO WO 2005/050544 6/2005

OTHER PUBLICATIONS

Yoshida. et al., "Three-Dimensional Computer-Aided Diagnosis Scheme for Detection of Colonic Polyps", IEEE Transactions on Medical Imaging, IEEE Service Center, Piscataway, NJ, US, vol. 20, No. 12, Dec. 2001, pp. 1261-1274.

Weickert, "Anisotropic Diffusion in Image Processing", Dissertation, Jan. 29, 1996, pp. 1-145.

Gerig et al., "Detection and Characterization of Unsharp Blobs by Curve Evolution", Information Processing and Medical Imaging, 1995, pp. 161-176.

* cited by examiner

*Primary Examiner* — Sath V Perungavoor
(74) *Attorney, Agent, or Firm* — Peter Withstandley

(57) ABSTRACT

A method for determining a blob-like structure in a target image includes receiving an input target image is received, determining a mean curvature of the input target image, smoothing the mean curvature is smoothed using a scale that determines a size of the blobs to be found, finding a blob-like structure in the input target image as a portion of the input target image where a smoothed curvature is higher than a threshold value, and outputting a result including an indication of the blob-like structure.

13 Claims, 2 Drawing Sheets

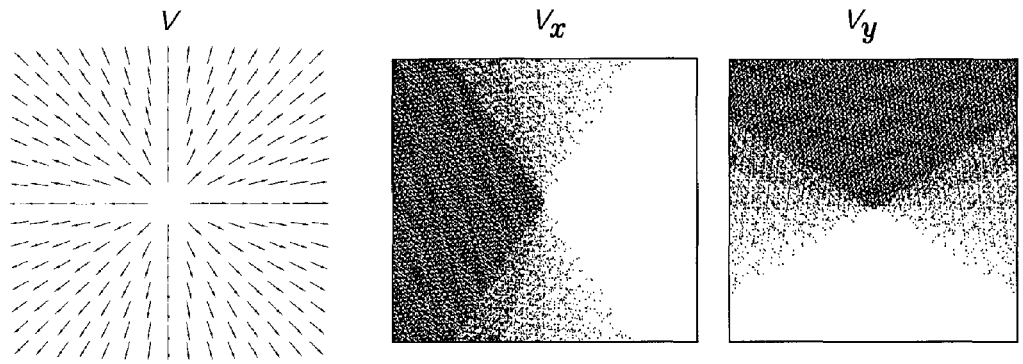
FIG. 1A   FIG. 1B   FIG. 1C
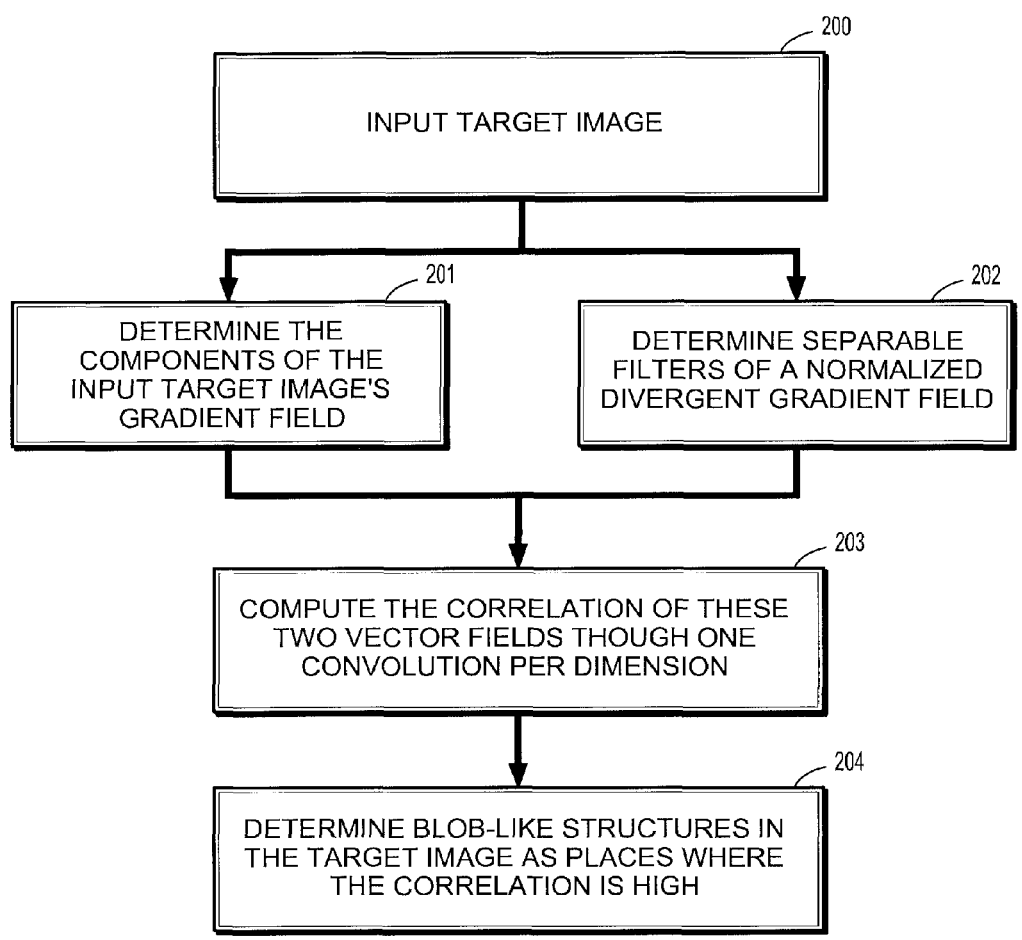
FIG. 2

FINDING BLOB-LIKE STRUCTURES USING DIVERGING GRADIENT FIELD RESPONSE

CROSS-REFERENCE TO RELATED APPLICATION

This application claims priority to U.S. Provisional Application Ser. Nos. 60/839,289, filed on Aug. 22, 2006, and 60/839,290, filed on Aug. 22, 2006, which are herein incorporated by reference in their entirety.

BACKGROUND OF THE INVENTION

1. Technical Field

The present invention relates to computer aided detection, and more particularly to a system and method for finding blob-like structures.

2. Discussion of Related Art

In the field of automatic detection systems, suppose that a bright solid sphere is sought in a given image having a given radius in a larger target image. One approach to detect objects in an image is to use template matching, in which a template of the object to be detected is first chosen or generated, and a correlation between the template and the target image for all possible valid shifts of the template within the target is computed. Then the peals of the correlation are selected as candidate positions of the object within the target image. In the case of locating a solid sphere of a given radius, a template solid sphere of the given radius is generated, and the template matching can be performed. However, high correlation peaks could be obtained even by objects within the target that are not spherical; for example, a solid box with sides larger than the radius of the sphere. One proposed solution to this problem is to use the edges (for example, the magnitude of the gradient) instead. That is, instead of detecting solid spheres, the edges in the image can be determined, and then search for a hollow sphere (or shell).

Therefore, a need exists for a system and method for determining blob-like structures.

SUMMARY OF THE INVENTION

According to an embodiment of the present disclosure, a method for determining a blob-like structure in a target image includes receiving an input target image is received, determining a mean curvature of the input target image, smoothing the mean curvature is smoothed using a scale that determines a size of the blobs to be found, finding a blob-like structure in the input target image as a portion of the input target image where a smoothed curvature is higher than a threshold value, and outputting a result including an indication of the blob-like structure.

According to an embodiment of the present disclosure, a system for determining a blob-like structure in a target image includes a memory device storing an input target image and a plurality of instructions embodying a computer aided blob-like structure detection system, and a processor for receiving the input target image and executing the plurality of instructions. The processor performing a method including determining a mean curvature of the input target image, smoothing the mean curvature is smoothed using a scale that determines a size of the blobs to be found, finding a blob-like structure in the input target image as a portion of the input target image where a smoothed curvature is higher than a threshold value, and outputting a result including an indication of the blob-like structure.

According to an embodiment of the present disclosure, a method for determining a blob-like structure in a target image includes receiving the target image as input, determining a diverging gradient field response function, wherein the diverging gradient field response includes a vector correlation of the field and a normalized gradient field of the target image, and determining the blob-like structure in the target image according to the vector correlation and a threshold.

BRIEF DESCRIPTION OF THE DRAWINGS

Preferred embodiments of the present invention will be described below in more detail, with reference to the accompanying drawings:

FIG. 1A is a 2-D diverging gradient field according to an embodiment of the present disclosure;

FIGS. 1B-C show the x- and y-magnitude components of the gradient field, respectively, according to an embodiment of the present disclosure;

FIG. 2 is a flow chart of a method for determining a blob-like structure using diverging gradient field components according to an embodiment of the present disclosure;

DETAILED DESCRIPTION OF EXEMPLARY EMBODIMENTS

Figure 3:
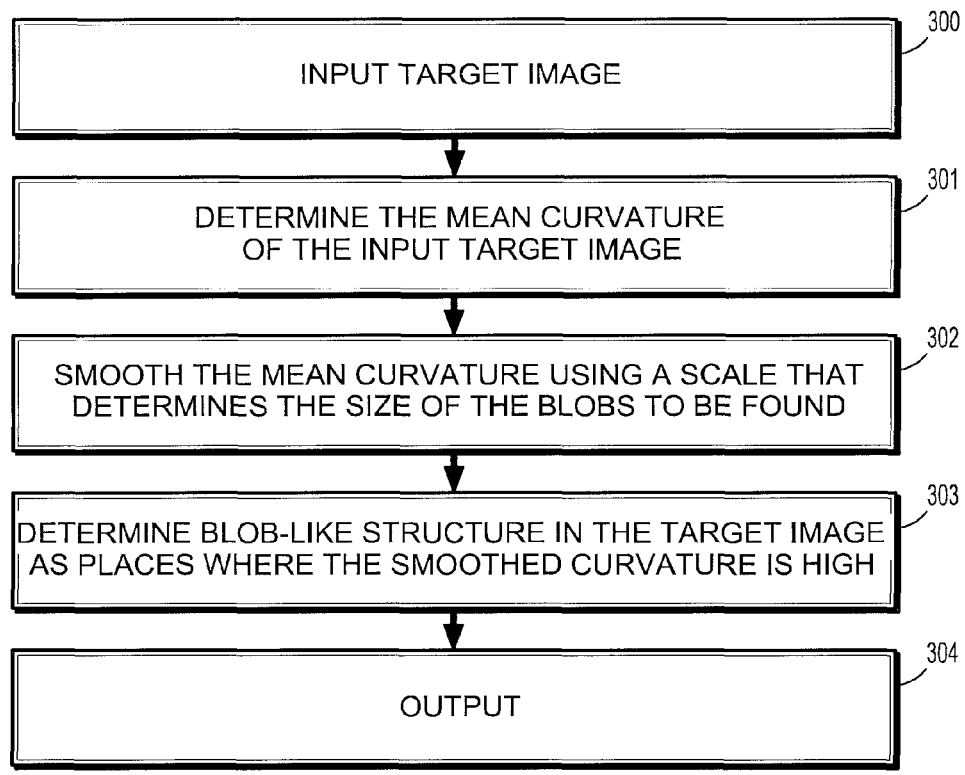
FIG. 3 Is a flow chart of a method for determining a blob-like structure using a mean curvature according to an embodiment of the present disclosure.

According to an embodiment of the present disclosure, a diverging gradient field response (DFGR) can be used to detect blob-like structures in medical images. Such blobs may be indicative of abnormal structures such as lung nodules. Semi-spherical structures such as colon polyps may also be detected. Examples of medial images include Computer Tomography (CT), Magnetic Resonance (MR), Positron Emission Tomography (PET), Single Positron Emission Tomography (SPECT), and X-rays.

According to an embodiment of the present disclosure, a set of separable filter banks are used to determine the DGFR. The DGFR looks for the sphere directly in the gradient domain, instead of the edges or magnitude of the gradient. Observe that the gradients of the spherical structure would appear to be diverging in the case of a sphere.

To detect this diverging field in the derivations of the target image, a template diverging field may be used. In order to be less sensitive to size, a set of concentric diverging fields may be used as shown in FIGS. 1A-B.

FIG. 1A shows a diverging gradient field in 2-D. FIGS. 1B-C show the x- and y-magnitude components of the diverging gradient field, respectively.

Referring to FIG. 2, to determine a DGFR response for a given target image 200 a function is determined whose gradients are diverging. For example, consider the following equation of the radius of a sphere:

$$s(x,y,z) = \sqrt{x^2 + y^2 + z^2}$$

The gradient of the sphere S is given by:

$$\vec{\nabla} s = s_x \vec{i} + s_z \vec{k}$$

Where the components $s_x(x,y,z)$, $s_y(x,y,z)$ and $s_z(x,y,z)$ are defined as:

$$s_x(x, y, z) = \frac{x}{\sqrt{x^2 + y^2 + z^2}},$$

$$s_y(x, y, z) = \frac{y}{\sqrt{x^2 + y^2 + z^2}},$$

$$s_z(x, y, z) = \frac{z}{\sqrt{x^2 + y^2 + z^2}}.$$

The field $\vec{\nabla}s$ is a diverging field. The DGFR includes the vector correlation of the field $\vec{\nabla}s$ with the normalized gradient field of the target image 201, and is given by:

$$dgfr(f) = \left(\frac{\vec{\nabla} f}{\|\vec{\nabla} f\|}\right) * (\vec{\nabla} s) = \left(\frac{f_x}{\|\vec{\nabla} f\|}\right) * s_x + \left(\frac{f_y}{\|\vec{\nabla} f\|}\right) * s_y + \left(\frac{f_z}{\|\vec{\nabla} f\|}\right) * s_z$$

where $f_x$, $f_y$, $f_z$ are the x-, y-, z-image gradients respectively, and $s_x$, $s_y$, $s_z$ are the diverging gradient field components defined in a template region $\Omega$ provided by the user. The normalization of the image gradients 201 makes the response insensitive to differing contrasts across different images, and across different regions in the image.

To determine dgfr three 3-D convolutions are performed, one per dimension of the image 203. In practice, this is expensive in terms of time. A separable version of the filters $s_x$, $s_y$ and $s_z$ may be determined 202 to mitigate the time needed to determine dgfr.

Referring to the set of separable filters 202, and more particularly to the Gaussian function; The function $g_\sigma$ may be used, which is a Gaussian, and whose gradient field is diverging.

$$g_\sigma(x, y, z) = \frac{1}{(2\pi\sigma^2)^{\frac{3}{2}}} e^{-\left(\frac{x^2+y^2+z^2}{2\sigma^2}\right)}.$$

Then:

$$dgfr(f) = \left(\frac{\vec{\nabla} f}{\|\vec{\nabla} f\|}\right) * (\vec{\nabla} g) = \left(\frac{f_x}{\|\vec{\nabla} f\|}\right) * g_x + \left(\frac{f_y}{\|\vec{\nabla} f\|}\right) * g_y + \left(\frac{f_z}{\|\vec{\nabla} f\|}\right) * g_z$$

which can be determined using the separable filters $g_x$, $g_y$, $g_z$:

$$g_x(x, y, z) = \frac{-x}{\sigma^2} g_\sigma(x, y, z),$$

$$g_y(x, y, z) = \frac{-y}{\sigma^2} g_\sigma(x, y, z),$$

$$g_z(x, y, z) = \frac{-z}{\sigma^2} g_\sigma(x, y, z).$$

A correlation of the two vector fields is determined through on convolution per dimension 203 and these derivative Gaussian filters are used for the determination of the DGFR to find blob-like structures in the input image 204. Using a determination of the correlation of the two vector fields can be expensive in terms of time, processing power, etc.

The speed of the determination of the DGFR for a given image may be increased using a scale space of mean curvature. Determining DGFR at a particular $\sigma$ is exactly equivalent to determining the mean curvature followed by smoothing with a Gaussian with parameter $\sigma$. This equivalence allows for faster determination of the DGFR by determining the curvature and applying a Gaussian filter.

Referring to FIG. 3, an input target image is input/received 300 and a mean curvature of the input target image is determined 301. The mean curvature is smoothed using a scale that determines the size of the blobs to be found 302 and blob-like structures are found in the input target image as places where the smoothed curvature is high 303, for example, as compared to a threshold value set by a user or as compared to surrounding portions of the input target image. An output 304 may include an image (e.g., shown on a display) wherein the blob-like structure is extracted or highlighted from the input target image, a set of coordinates of the blob-like structure stored to memory, etc.

Without loss of generality, 3-D images are used as the input target image in the follow exemplary implementation for showing that $dgfr_\sigma$ is the scale-space of curvature. The methods may be extended to N-D applications (where N is a natural number).

Gradient of a scalar f:

$$\vec{\nabla} f = \frac{\partial f}{\partial x}\vec{i} + \frac{\partial f}{\partial y}\vec{j} + \frac{\partial f}{\partial z}\vec{k}$$

$$= f_x\vec{i} + f_y\vec{i} + f_x\vec{k}$$

Magnitude of gradient field:

$$\|\vec{\nabla} f\| = \sqrt{f_x^2 + f_y^2 + f_z^2}$$

Convolution of vector $\vec{F} = p\vec{i} + q\vec{j} + r\vec{k}$ with scalar s:

$$\vec{G} = \vec{F}*s + (p*s)\vec{i} + (q*s)\vec{j} + (r*s)\vec{k}$$

Divergence of a vector filed $\vec{F} = p\vec{i} + q\vec{j} + r\vec{k}$, also denoted as $\nabla \cdot \vec{F}$:

$$div(\vec{F}) = \frac{\partial}{\partial x}p + \frac{\partial}{\partial y}q + \frac{\partial}{\partial z}r$$

$$= p_x, q_y, r_z$$

Referring to the diverging gradient field response:
Given a Gaussian $$g_\sigma(x, y, z) = \frac{1}{(2\pi\sigma^2)^{\frac{3}{2}}} e^{-\left(\frac{x^2+y^2+z^2}{2\sigma^2}\right)},$$

the diverging gradient field response may be written as:

$$dgfr(f) = \left(\frac{\vec{\nabla} f}{\|\vec{\nabla} f\|}\right) * (\vec{\nabla} g) = \left(\frac{f_x}{\|\vec{\nabla} f\|}\right) * g_x + \left(\frac{f_y}{\|\vec{\nabla} f\|}\right) * g_y + \left(\frac{f_z}{\|\vec{\nabla} f\|}\right) * g_z.$$

where $g_x$, $g_y$, $g_z$ are the x-, y- and z-derivatives of the Gaussian $g_\sigma$.

$$div(\vec{F}*s) = \frac{\partial}{\partial x}(p*s) + \frac{\partial}{\partial y}(q*s) + \frac{\partial}{\partial z}(r*s) \quad (1)$$
$$= p_x*s + q_y*s + r_z*s$$
$$= (p_x + q_y + r_z)*s$$
$$= div(\vec{F})*s$$

also:

$$div(\vec{F}*s) = \frac{\partial}{\partial x}(p*s) + \frac{\partial}{\partial y}(q*s) + \frac{\partial}{\partial z}(r*s) \quad (2)$$
$$= p_x*s + q_y*s + r_z*s$$
$$p*s_x + q*s_y + r*s_z$$

Here, the DGFR is the scale-space of curvature. Consider:

$$dgfr(f) = \left(\frac{f_x}{\|\vec{\nabla}f\|}\right)*g_x + \left(\frac{f_y}{\|\vec{\nabla}f\|}\right)*g_y + \left(\frac{f_z}{\|\vec{\nabla}f\|}\right)*g_z$$
$$= div\left(\left(\frac{f}{\|\vec{\nabla}f\|}\right)*g\right) \text{ from Eq. (2)}$$
$$= div\left(\frac{f}{\|\vec{\nabla}f\|}\right)*g \text{ from Eq. (1)}$$

Thus, $$dgfr_\sigma = \left(\frac{\vec{\nabla}f}{\|\vec{\nabla}f\|}\right)*g_\sigma$$

Note that $$div\left(\frac{\vec{\nabla}f}{\|\vec{\nabla}f\|}\right)$$

is the definition of a mean curvature. Thus, $dgfr_\sigma$ is the scale-space of curvature.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 4:
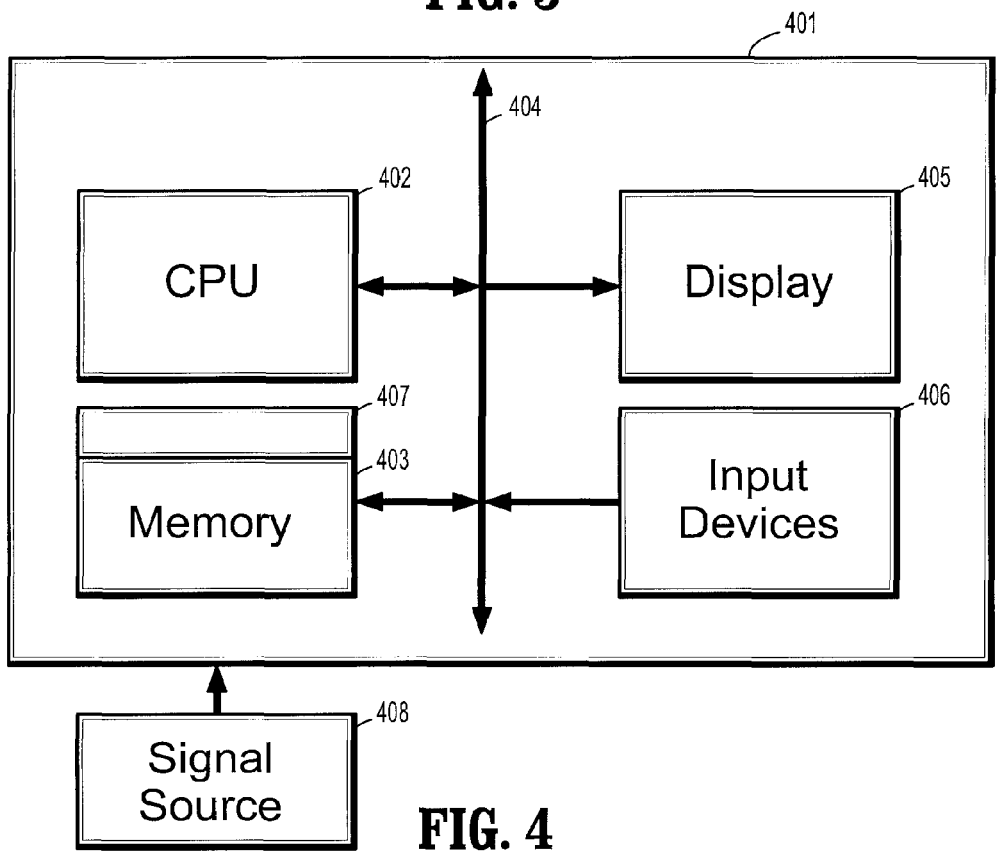
FIG. 4 is a diagram of a system according to an embodiment of the present disclosure.

Referring to FIG. 4, according to an embodiment of the present invention, a computer system 401 for determining a blob-like structure in a target image can comprise, inter alia, a central processing unit (CPU) 402, a memory 403 and an input/output (I/O) interface 404. The computer system 401 is generally coupled through the I/O interface 404 to a display 405 for displaying, inter alia, an output image, and various input devices 406 such as a mouse and keyboard. The support circuits can include circuits such as cache, power supplies, clock circuits, and a communications bus. The memory 403 can include random access memory (RAM), read only memory (ROM), disk drive, tape drive, etc., or a combination thereof. The present invention can be implemented as a routine 407 that is stored in memory 403 and executed by the CPU 402 to process a signal, e.g., an input target image, from the signal source 408. As such, the computer system 401 is a general purpose computer system that becomes a specific purpose computer system when executing the routine 407 of the present invention. The computer system 401 may further include a GPU 409 for processing certain operations.

The computer platform 401 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for a system and method for determining a blob-like structure in a target image, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A non-transitory computer readable medium embodying instructions executable by a processor to perform a method for identifying a blob-like structure in a target image, the method comprising:

receiving an input target image;

determining a mean curvature of the input target image;

smoothing the mean curvature using a scale that determines a size of blob-like structures to be found;

finding a blob-like structure in the input target image as a portion of the input target image where a smoothed curvature is higher than a threshold value wherein finding a blob-like structure comprises computing a diverging gradient field response, wherein the diverging gradient field response is a scale-space of curvature of the input target image, wherein the scale-space of curvature is determined as $$dgfr_\sigma = div\left(\frac{\vec{\nabla}f}{\|\vec{\nabla}f\|}\right)*g_\sigma$$

where f is a scalar, $$-div\left(\frac{\vec{\nabla} f}{\|\vec{\nabla} f\|}\right)$$

is the mean curvature, and
$g_\sigma$ is a Gaussian; and outputting a result including an indication of the blob-like structure.

2. The method of claim 1, wherein the result is an image of the blob-like structure.

3. The method of claim 1, wherein the result is a set of coordinates of the blob-like structure.

4. The method of claim 1, wherein the diverging gradient field response is used to determine a sphere corresponding to the blob-like structure directly in a gradient domain.

5. The method of claim 1, wherein the input target image is N-dimensional, where N is a natural number.

6. A system for identifying a blob-like structure in a target image comprising:
   a memory device storing an input target image and a plurality of instructions embodying a computer aided blob-like structure detection system; and
   a processor for receiving the input target image and executing the plurality of instructions to perform a method comprising:
   determining a mean curvature of the input target image;
   smoothing the mean curvature using a scale that determines a size of the blob-like structures to be found;
   finding a blob-like structure in the input target image as a portion of the input target image where a smoothed curvature is higher than a threshold value, wherein finding a blob-like structure comprises computing a diverging gradient field response, wherein the diverging gradient field response is a scale-space of curvature of the input target image, wherein the scale-space of curvature is determined as $$dgfr_\sigma = div\left(\frac{\vec{\nabla} f}{\|\vec{\nabla} f\|}\right) * g_\sigma$$

where f is a scalar, $$-div\left(\frac{\vec{\nabla} f}{\|\vec{\nabla} f\|}\right)$$

is the mean curvature, and
$g_o$ is a Gaussian; and outputting a result including an indication of the blob-like structure.

7. The system of claim 6, wherein the result is an image of the blob-like structure output to a display device in communication with the processor.

8. The system of claim 6, wherein the result is a set of coordinates of the blob-like structure stored to the memory.

9. The system of claim 6, wherein the diverging gradient field response is used to determine a sphere corresponding to the blob-like structure directly in a gradient domain.

10. The system of claim 6, wherein the input target image is N-dimensional, where N is a natural number.

11. A non-transitory computer readable medium embodying instructions executable by a processor to perform a method for identifying a blob-like structure in a target image, the method comprising:
    receiving the target image as input;
    determining a diverging gradient field response function, wherein the diverging gradient field response includes a vector correlation of the field and a normalized gradient field of the target image wherein determining the diverging gradient field response function includes determining diverging gradient field components as separable Gaussian filters; and
    identifying a blob-like structure in the target image according to the vector correlation and a threshold.

12. The method of claim 11, wherein diverging gradient field components are normalized.

13. The method of claim 11, wherein the vector correlation includes multiple convolutions, one per dimension of the target image.

\* \* \* \* \*